Nov. 22, 1960   R. H. DUNGAN   2,960,747
MOLDING METHOD FOR CERAMICS
Filed Aug. 18, 1958

INVENTOR.
ROBERT H. DUNGAN
BY
ATTORNEY

United States Patent Office 2,960,747
Patented Nov. 22, 1960

2,960,747
MOLDING METHOD FOR CERAMICS

Robert H. Dungan, Hopkins, Minn., assignor to Minneapolis-Honeywell Regulator Company, Minneapolis, Minn., a corporation of Delaware Filed Aug. 18, 1958, Ser. No. 755,652

3 Claims. (Cl. 25—157)

The present invention relates generally to the process of preparing improved ceramic bodies and to the method and apparatus employed in this preparation. This invention in particular relates to the preparation of ceramic bodies including a constituent which is volatile at the firing temperatures required for bringing the body to maturity, and therefore advantageously is adaptable to a hot-pressing technique for properly retaining these volatile constituents. For example, the invention is particularly adaptable to the preparation of lead zirconate-titanate bodies. In connection with this particular composition, the PbO which has an appreciable volatility at over 943° C. may be retained in the composition when pressure is applied to the green ceramic charge while it is being fired to maturity. The composition of the mold is made substantially inactive toward the lead zirconate-titanate mixtures, and hence good release of the product from the mold is promoted. The chief advantage of the mold body of the present invention lies in the thermal expansion and contraction characteristics of the body. In this connection, at 1000° C. the material undergoes a sharp dimensional change due to a change in the crystalline structure, this change causing sudden expansion to occur upon cooling. Of course, contraction occurs at the same temperature upon heating, this being in the proper direction to encourage preparation of ceramic bodies having good dimensional characteristics. The expansion upon cooling facilities ready separation of the fired product from the mold surfaces and there is accordingly substantially no tendency for the material being molded to adhere to the mold body.

It is therefore a general object of the present invention to provide an improved ceramic mold body composition.

It is a further object of the present invention to provide improved method of removal or release of a mature fired ceramic body from a mold, this release being accomplished due to a transition in the crystalline structure of the mold body during the firing cycle.

Figure 1:
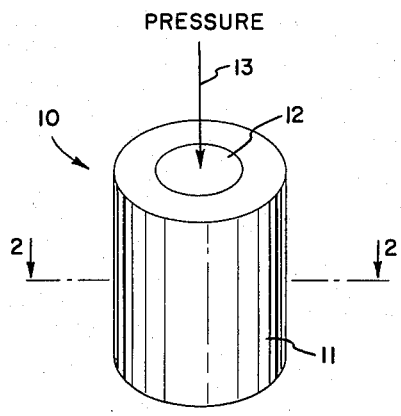
Figure 2:
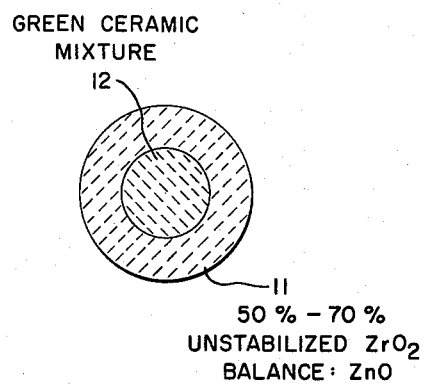
Figure 3:
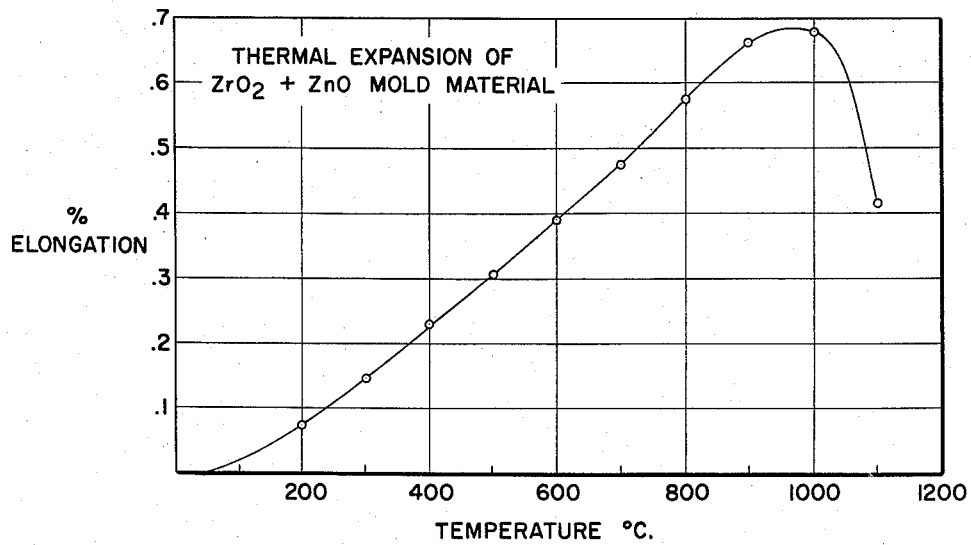

Other and further objects of the present invention will become apparent upon a study of the following specification, appended claims, and accompanying drawings, wherein Figure 1 is a perspective view of a mold body prepared in accordance with the present invention and having a ceramic charge therein;

Figure 2 is a horizontal sectional view taken along the lines in direction of the arrows 2—2 of Figure 1; and Figure 3 is a graph showing the relative thermal expansion vs. temperature of a mold body prepared in accordance with the present invention.

The preparation of the mold bodies in connection with the present invention may be carried out as follows. A mixture containing unstabilized zirconium dioxide, zinc oxide and binders is weighed out according to Table 1 below.

TABLE 1

| Compound: | Parts by weight |
|---|---|
| $ZrO_2$ (unstabilized) | 60 |
| ZnO | 40 |
| Binders— | |
| 2% methocel | } 3 |
| 1% stearic acid | |

It has been determined that the mold material may be suitably prepared containing between about 50 parts and 70 parts of unstabilized zirconium dioxide and from 30 parts to 50 parts of zinc oxide, however the composition as shown in Table 1 is generally preferred. This mixture is ball milled under water for a period of about 3 hours or until homogeneously dispersed, the ingredients being initially of 325 mesh size. Subsequent to ball milling, the mixed material is dried and ground briefly until the agglomerates formed upon drying are broken down. A mold body is then pressed from this material to the approximate size and shape desired whereupon the body is sintered for a period of about two hours at a temperature of 1000° C. This sintering provides the material with a certain amount of mechanical strength and permits further working to be done. After the initial sintering, the mold cavity is drilled out or otherwise formed to the configuration desired and the mold body is then fired to maturity at a temperature of about 1360° C. for a period of at least two hours. Inasmuch as the mold bodies are particularly adaptable for use under hot-pressing preparation techniques, a push-rod which is prepared from the same material as in the mold composition is preferably used. The zirconium dioxide provides the sharp dimensional change in the mold body, this change occurring at about 1000° C.

Accordingly a mold body such as is shown in Figures 1 and 2 and generally designated 10 is provided including a wall 11 defining a cavity 12 therein the cavity having any desired configuration as may be dictated by the finished product to be formed. Suitable means, not shown, are provided for applying pressure to the green ceramic charge such as is indicated in Figure 1 by the arrow 13. A push-rod of the same material as the mold is generally preferred. Minimum sidewall thickness and the like may be determined in part by the unit pressure contemplated during firing and pressing. In this connection, for materials such as lead zirconate-titanate sidewall thicknesses in the range of ⅜" are required. Of course this is a minimum thickness and thicker walls may be utilized if desired.

Ceramic product molding

In carrying out a ceramic molding operation in accordance with the present invention, and in particular with reference to lead zirconate-titanate, the following procedures have been found suitable. The raw ingredients are measured out in accordance with the ranges shown in Table II below:

TABLE II

| | Mol percent |
|---|---|
| $PbZrO_3$ | 52–56. |
| $PbTiO_3$ | 48–44. |
| Binder* | 3% by weight of $PbZrO_3$—$PbTiO_3$. |

* Emulsified hydrocarbon wax capable of being essentially totally volatilized during 1000° F. firing.

The lead zirconate-titanate composition is measured according to the range desired and is then placed in a ball mill for a period of about three hours until thoroughly and homogeneously mixed. The material is then dried and ground until agglomerates formed during the process are broken up. The above mixture is calcined at about 1000° F. for ½ hour and then broken up. The calcined ceramic mixture is then ready to be placed in the mold body and fired to maturity. In this connection, a certain range of firing temperatures may be employed, each temperature having a certain corresponding applied pressure dictated by the sublimation pressure of the volatile constituents. In this connection a preferred time-pressure arrangement is 20 minutes at 1175° C. under a pressure of 500 p.s.i. Of course, one half to one hour may be employed if desired and deemed useful for particular configurations or the like. These time-temperature relationships for various materials may, of course, be readily determined by those skilled in the art. It has been determined that a pressure ranging from 300 to 1000 p.s.i. is necessary depending upon the firing temperature utilized which may range between 1150° C. and 1200° C. Firing times may be adjusted to from between five minutes to sixty minutes depending upon the temperatures employed. In this process, it is to be remembered that the pressure employed must be adequate to retain the fugitive compositions within the mold body and this is accomplished by utilizing a physical pressure which is somewhat greater than the sublimation pressure of the most volatile constituent of ceramic mixture during molding.

The above example is illustrative of other similar procedures which may be employed in connection with the present invention. For example, other ceramic compositions containing fugitive oxides may be advantageously treated and in accordance with the present invention, such as for example, lead niobate or cadmium niobate.

While methocel-stearic acid are preferred as binder materials, it will be appreciated that other suitable binders may be employed as well. These are readily ascertainable and known to those skilled in the art.

It will be understood that the various specific examples given herein are set out for purposes of illustration only and there is no intention of limiting the coverage of this application to these particular specific examples alone. It will be appreciated that various modifications may be utilized by those skilled in the art without departing from the spirit and scope of the present invention.

I claim as my invention:

1. The method of preparing a molded ceramic body having a firing temperature above 1000° C. and having a positive coefficient of expansion on heating which comprises the steps of filling a cavity in a mold body with a green ceramic substance to be molded, which body consists essentially of a mature fired mixture of from about 50% by weight to about 70% by weight of unstabilized $ZrO_2$ balance ZnO and is characterized by expansion upon cooling below the firing temperature, applying pressure to said green ceramic in said cavity, said pressure being in excess of the vapor pressure of constituents of said green ceramic substance at the firing temperature of said green ceramic substance, firing said green ceramic for a period of time sufficient to mature said green ceramic, removing the applied pressure, cooling said mold to below firing temperature to effect separation of the fired ceramic from the mold cavity, and removing the fired ceramic from the mold.

2. The method of preparing a molded ceramic body having a firing temperature above 1000° C. and having a positive coefficient of expansion on heating which comprises the steps of filling a cavity in a mold body with a green ceramic substance to be molded, which body consists essentially of a mature fired mixture of from about 50% by weight to about 70% by weight of unstabilized $ZrO_2$ balance ZnO and is characterized by expansion upon cooling below the firing temperature, firing said green ceramic for a period of time sufficient to mature said green ceramic, cooling said mold below firing temperature to effect separation of the fired ceramic from the mold cavity, and removing the ceramic from the mold.

3. The method of preparing a matured ceramic body of lead zirconate-lead titanate type, which method comprises the steps of filling the cavity in a mold body with the green ceramic substance to be molded, which body consists essentially of a mature fired mixture of from about 50% by weight to about 70% by weight of unstabilized $ZrO_2$ balance ZnO and is characterized by expansion upon cooling below the firing temperature, applying pressure to said green ceramic within said cavity, said pressure being in excess of 300 p.s.i., heating to a temperature in excess of 1150° C. for a period of time sufficient to mature said green ceramic, cooling said mold below firing temperature to effect separation of the fired ceramic from the mold cavity, and removing the ceramic from the mold.

References Cited in the file of this patent

UNITED STATES PATENTS

| | | |
|---|---|---|
| 2,427,034 | Wainer | Sept. 9, 1947 |
| 2,483,794 | Wentworth | Oct. 4, 1949 |
| 2,534,652 | Allison et al. | Dec. 19, 1950 |
| 2,535,180 | Watson | Dec. 26, 1950 |
| 2,694,245 | Rogers et al. | Nov. 16, 1954 |